United States Patent [19]

Murakami

[11] Patent Number: 4,773,512
[45] Date of Patent: Sep. 27, 1988

[54] DRUM BRAKE SHOE WITH REINFORCEMENT FLANGES OR REINFORCEMENT PLATES POSITIONED AT IRREGULAR INTERVALS FOR NOISE REDUCTION

[75] Inventor: Hideto Murakami, Hatano, Japan

[73] Assignee: Nissan Motor Company, Ltd., Japan

[21] Appl. No.: 53,538

[22] Filed: May 26, 1987

Related U.S. Application Data

[63] Continuation of Ser. No. 755,589, Jul. 16, 1985, abandoned.

[30] Foreign Application Priority Data

Jul. 18, 1984 [JP] Japan .................. 59-148867

[51] Int. Cl.⁴ .................. F16D 65/08; F16D 69/00
[52] U.S. Cl. .................. 188/250 E; 188/218 R; 188/250 D; 188/73.1; 188/250 A; 188/218 A; 188/247
[58] Field of Search ............ 188/250, 247, 252, 253, 188/234, 73.1, 73.2, 205, 206, 218 A, 218 XL, 73.37, 261, 249, 259, 77 W, 77 R, 218 R, 237; 192/107 R; 74/574

[56] References Cited

U.S. PATENT DOCUMENTS

| | | | |
|---|---|---|---|
| 1,628,388 | 5/1927 | Cautley | 188/250 D |
| 1,699,155 | 1/1929 | Muhleisen | 188/250 E X |
| 1,732,349 | 10/1929 | Bendix | 188/250 C |
| 1,743,412 | 1/1930 | Waite | 188/250 C |
| 1,756,353 | 4/1930 | Gruber | 188/249 |
| 1,846,080 | 2/1932 | Bendix | 188/250 D |
| 1,874,863 | 8/1932 | Bendix | 188/250 C |
| 1,977,535 | 10/1934 | Troup | 188/250 A X |
| 2,022,328 | 11/1935 | Trask | 188/250 D |
| 2,048,433 | 7/1936 | Delahaye | 188/250 A |
| 2,331,563 | 10/1943 | Murphy | 188/247 X |
| 2,568,777 | 9/1951 | Super | 188/250 C |
| 2,658,473 | 11/1953 | Hunt | 188/250 C |
| 2,791,299 | 5/1957 | Bonkowski | 188/234 |
| 2,928,510 | 3/1960 | Kay | 188/250 C |
| 3,509,973 | 5/1970 | Kimata | 188/218 A |
| 3,866,977 | 2/1975 | Rice | 188/218 A X |
| 3,983,973 | 10/1976 | Zboralski et al. | 188/218 A |
| 3,998,300 | 12/1976 | Sullivan | 188/250 A |
| 4,003,451 | 1/1977 | Torok | 188/250 E X |
| 4,379,501 | 4/1983 | Hagiwara et al. | 188/218 A X |
| 4,523,666 | 6/1985 | Murray | 188/218 X L |
| 4,573,249 | 3/1986 | Shellhause | 188/250 C X |

FOREIGN PATENT DOCUMENTS

| | | | |
|---|---|---|---|
| 0026578 | 4/1981 | European Pat. Off. | 188/250 E |
| 2901349 | 7/1979 | Fed. Rep. of Germany | 188/218 A |
| 918266 | 10/1946 | France | 188/250 D |
| 57604 | 12/1952 | France | 188/250 D |
| 0040273 | 3/1977 | Japan | 188/250 C |
| 0040023 | 3/1984 | Japan | 188/250 D |
| 0040025 | 3/1984 | Japan | 188/250 D |
| 0027324 | 2/1986 | Japan | 188/250 E |

Primary Examiner—Douglas C. Butler
Attorney, Agent, or Firm—Foley & Lardner, Schwartz, Jeffery, Schwaab, Mack, Blumenthal & Evans

[57] ABSTRACT

A drum brake shoe is provided with a plurality of reinforcements which are arranged at irregular intervals on the inner periphery of a rim.

9 Claims, 5 Drawing Sheets

FIG. 1A
FIG. 1B
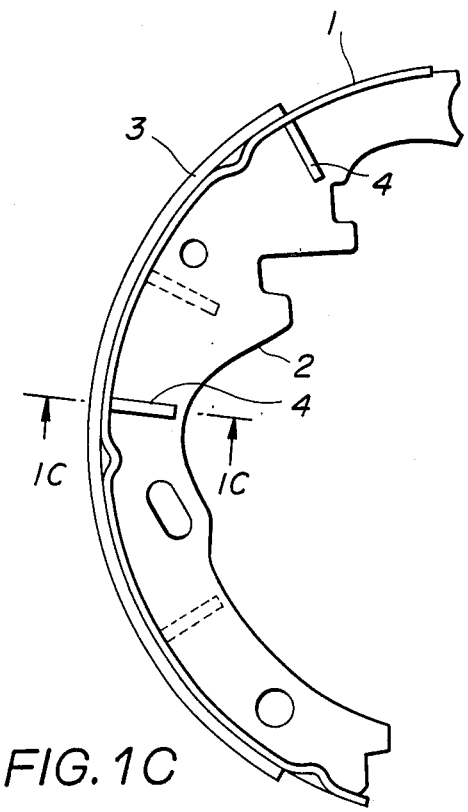
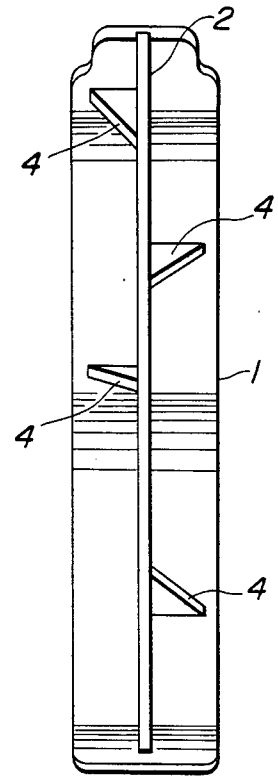
FIG. 1C
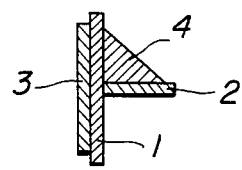

FIG.4A
FIG.4B
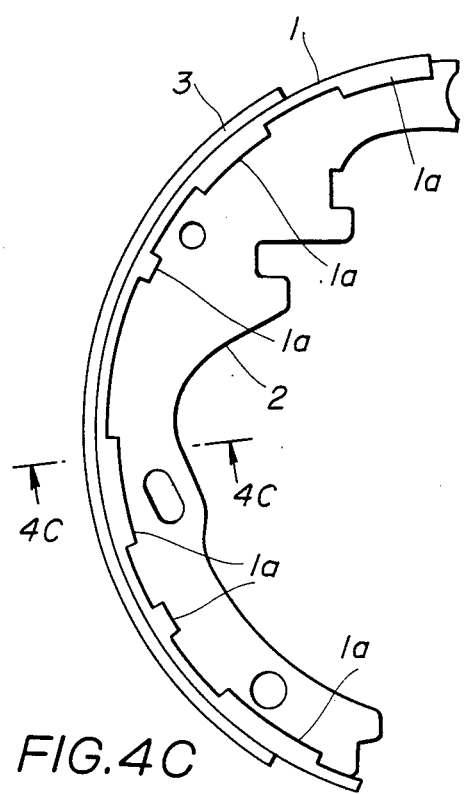
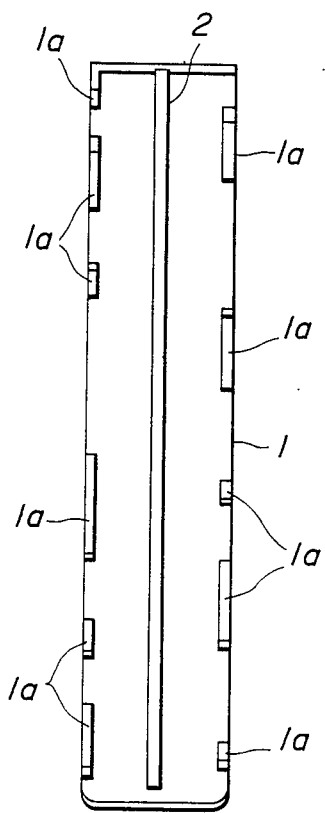
FIG.4C
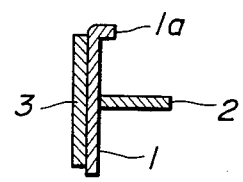

FIG.5A
(Prior Art)
FIG.5B
(Prior Art)
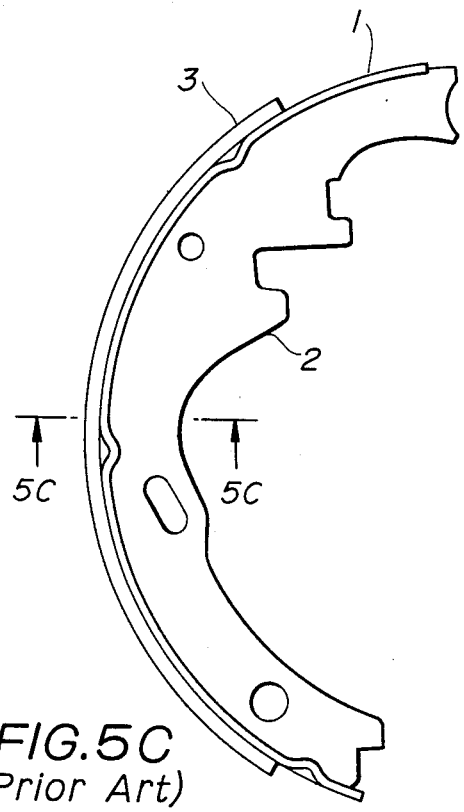
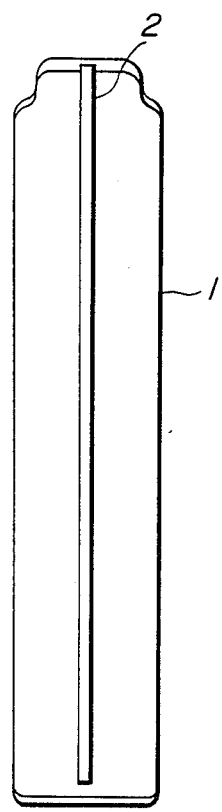
FIG.5C
(Prior Art)
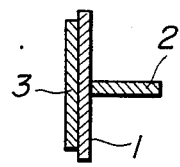

DRUM BRAKE SHOE WITH REINFORCEMENT FLANGES OR REINFORCEMENT PLATES POSITIONED AT IRREGULAR INTERVALS FOR NOISE REDUCTION

This application is a continuation of application Ser. No. 755,589, filed July 16, 1985, now abandoned.

BACKGROUND OF THE INVENTION

1. Field of the Invention

The present invention relates in general to drum brakes for automotive vehicles, etc. and particularly to drum brake shoes.

2. Description of the Prior Art

Such a brake shoe shown in FIGS. 5A through 5C has heretofore been used in drum brakes for automotive vehicles, etc.

The drum brake shoe consists of an arcuated rim 1, a web 2 fixed to the inner periphery of the rim 1 at an intermediate portion between opposite arcuated edges thereof, and a lining 3 bonded or otherwise secured to the outer periphery of a brake drum (not shown) when the brake is applied.

A disadvantage of the prior art brake drum shoe is that its torsional strength or rigidity is small since it is of a T-section. For this reason, the drum brake shoe has many modes of vibration and is liable to resonate in response to the vibration of the drum and cause chattering of the brake.

SUMMARY OF THE INVENTION

In accordance with the present invention, a drum brake shoe is provided with a plurality of reinforcements (either in the form of plates or flanges) which are arranged at irregular intervals on the inner periphery of a rim.

By the provision of such reinforcements, the drum brake shoe is irregularly reinforced in torsional strength or rigidity, whereby to make irregular the pitches of nodes upon torsional vibration and thereby make it difficult for the drum brake shoe to have man modes of vibration.

It is accordingly an object of the present invention to provide a novel and improved drum brake shoe which are free from the above noted disadvantages inherent in the prior art device.

It is a further object of the present invention to provide a novel and improved drum brake shoe of the above mentioned character which is quite useful in practice though so simple in structure.

BRIEF DESCRIPTION OF THE DRAWINGS

The features and advantages of the drum brake shoe according to the present invention will become more clearly appreciated from the following description taken in conjunction with the accompanying drawings, in which like reference characters designate like or corresponding parts in the several views and wherein:

FIG. 1A is an elevational view of a drum brake shoe according to an embodiment of the present invention;

FIG. 1B is a side view of the drum brake shoe of FIG. A;

FIG. 1C is a sectional view taken along the line 1C—1C of FIG. 1A;

FIG. 4A is a view similar to FIG. 1A but showing a further modification of the present invention;

FIG. 4B is a side view of the drum brake shoe of FIG. 4A;

FIG. 4C is a sectional view taken along the line 4C—4C of FIG. 4B;

FIG. 5A is a view similar to FIG. 1A but showing a prior art drum brake shoe;

FIG. 5B is a side view of the drum brake shoe of FIG. 5A; and

FIG. 5C is a sectional view taken along the line 5C—5C of FIG. 5B.

DETAILED DESCRIPTION OF THE PREFERRED EMBODIMENTS

Referring first to FIGS. 1A to 1C, a drum brake shoe of the present invention is provided with a plurality of reinforcement plates 4 which are arranged alternately on each sides of a web 2 and at irregular intervals. The reinforcement plates 4 are of the same thickness, size and triangular shape. More specifically, each of the reinforcement plates 4 has two edges meeting at right angles and is brought into contact thereat with a rim 1 and the web 2 to hold the same relative to each other.

By the provision of the reinforcement plates 4, the torsional strength or rigidity of the drum brake shoe can be increased irregularly.

Figure 2A:
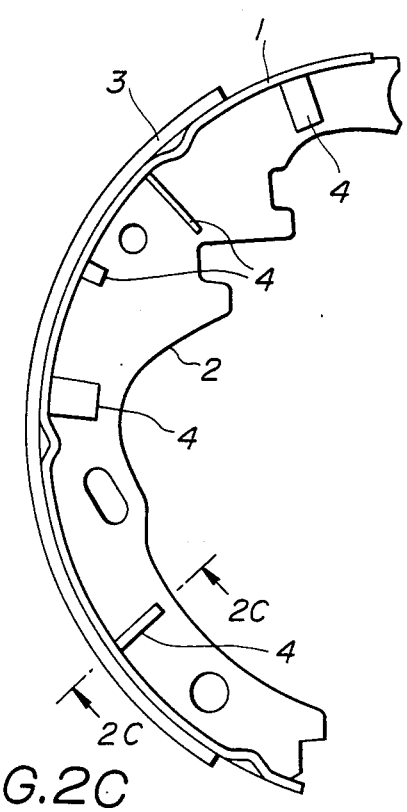
FIG. 2A is a view similar to FIG. 1A but showing a modification of the present invention.
Figure 2B:
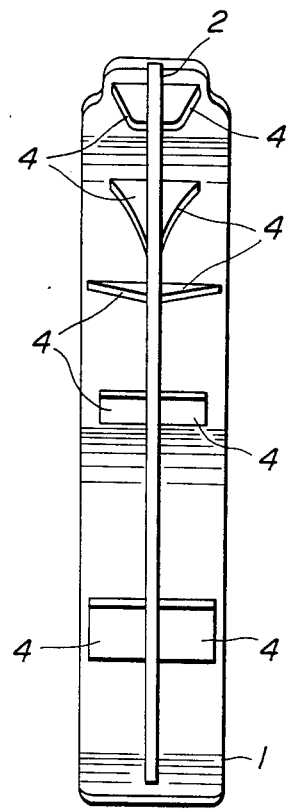
FIG. 2B is a side view of the drum brake shoe of FIG. 2A.
Figure 2C:
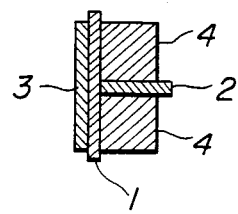
FIG. 2C is a sectional view taken along the line 2C—2C of FIG. 2B.

Referring next to FIGS. 2A to 2C, this embodiment differs from the previous embodiment in that its reinforcement plates 4 are adapted to form a plurality of pairs each of which are of the same thickness, size and shape and arranged in a manner to oppose to each other with the web 2 between them, and that the reinforcement plates 4 on each side of the web 2 are different in thickness, size and shape from each other. In other words, the reinforcement plates 4 on one side of the web 2 are arranged at the same irregular intervals as those at which the reinforcement plates 4 on the other side of the web 2 are arranged.

This embodiment makes it possible to increase the torsional strength or rigidity of the drum brake shoe more efficiently.

Figures 3A, 3B:
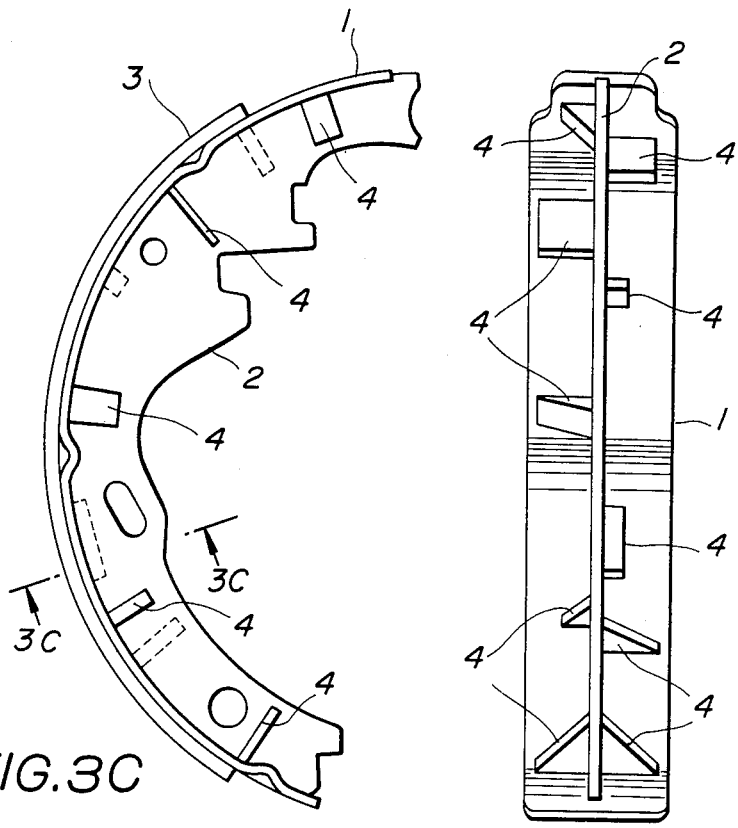
FIG. 3A is a view similar to FIG. 1A but showing another modification of the present invention.
FIG. 3B is a side view of the drum brake shoe of FIG. 3A.
Figure 3C:
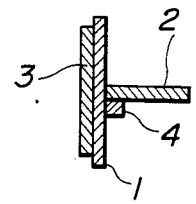
FIG. 3C is a sectional view taken along the line 3C—3C of FIG. 3B.

Referring to FIGS. 3A to 3C, this embodiment differs from the previous embodiment of FIG. 1 in that the reinforcement plates 4 on each side of the web 2 are different in thickness, size and shape from each other and that the reinforcement plates 4 on one side of the web 2 are arranged at irregular intervals which are different from those at which the reinforcement plates on the other side of the web 2 are arranged.

This embodiment makes it possible to increase the torsional strength or rigidity of the drum brake shoe more efficiently, as similar to the embodiment of FIGS. 2A to 2C.

In the foregoing, it is to be noted that any of the embodiments does not increase the bending strength or rigidity of the drum brake shoe and therefore does not deteriorate abutment of the lining 3 on the drum and cause a deteriorated braking action.

Referring to FIGS. 4A to 4C, this embodiment differs from the previous embodiments in that the rim 1 is provided with, in place of the foregoing reinforcement plates 4, a plurality of integral flanges 1a at its opposite arcuated edges. The flanges 1a on each edge of the rim are different in circumferential length from each other and arranged at irregular intervals.

This embodiment can produce substantially the same effect as the previous embodiment of FIGS. 1A to 1C and in addition can be manufactured easier as compared with the foregoing three embodiments.

What is claimed is:

1. A drum brake shoe comprising:
an arcuate rim having inner and outer peripheries;
a web fixed to the inner periphery of said rim at an intermediate portion between opposite arcuate edges thereof;
a lining secured to the outer periphery of said rim for effecting braking contact with a brake drum; and
a plurality of reinforcement flanges of varying lengths, said flanges positioned at irregular intervals along the opposite arcuate edges of the inner periphery of said rim such that any natural mode of vibration corresponding to that caused by vibration of the brake drum is prevented and the noise associated with said braking contact is reduced.

2. A drum brake shoe comprising:
an arcuate rim having inner and outer peripheries;
a web fixed to the inner periphery of said rim at an intermediate portion between opposite arcuate edges thereof;
a lining secured to the outer periphery of said rim for effecting braking contact with a brake drum;
and a plurality of reinforcement plates positioned at irregular intervals on the inner periphery of said rim, said plates being rigidly affixed both to said web and the inner periphery of said rim such that any natural mode of vibration corresponding to that caused by vibration of the brake drum is prevented and the noise associated with said braking contact is reduced.

3. A drum brake shoe as set forth in claim 2 in which said reinforcement plates are each of the same thickness, size and shape and are alternately arranged on opposite sides of said web to hold said rim and said web relative to each other.

4. A drum brake shoe as set forth in claim 2 in which said reinforcement plates are of the same triangular shape and each of which has two edges meeting at right angles, the two edges of said plates being respectively positioned in contact with said web and said rim.

5. A drum brake shoe as set forth in claim 2 in which said reinforcement plates are positioned on opposite sides of said web to hold said rim and said web relative to each other, said reinforcement plates on one side of said web being arranged at the same irregular intervals as those on the other side of said web.

6. A drum brake shoe as set forth in claim 5 in which said reinforcement plates are a plurality of pairs of equal thickness, size and shape, said reinforcement plates being positioned to oppose each other with the web therebetween.

7. A drum brake shoe as set forth in claim 6 in which the geometric shape of a pair of reinforcement plates may differ from the geometric shape of another pair.

8. A drum brake shoe as set forth in claim 2 in which said reinforcement plates are arranged on opposite sides of said web to hold said rim and said web relative to each other, said reinforcement plates on one side of said web being arranged at irregular intervals different from the intervals at which the reinforcement plates on the other side of said web are arranged.

9. A drum brake shoe as set forth in claim 2 in which said reinforcement plates on each side of said web may differ in thickness, size and shape from each other.

* * * * *